United States Patent [19]

Beckman et al.

[11] Patent Number: 4,570,301
[45] Date of Patent: Feb. 18, 1986

[54] STUFFING HORN CLEAN OUT

[75] Inventors: John H. Beckman, Downers Grove; Joseph A. Nausedas, Oak Forest, both of Ill.

[73] Assignee: Union Carbide Corporation, Danbury, Conn.

[21] Appl. No.: 665,909

[22] Filed: Oct. 29, 1984

[51] Int. Cl.[4] .............................................. A22C 11/06
[52] U.S. Cl. .......................................... 17/49; 17/35; 17/41
[58] Field of Search ....................... 17/1 R, 41, 42, 33, 17/49, 35

[56] References Cited

U.S. PATENT DOCUMENTS

| 1,032,194 | 4/1919 | Mayer. | |
|---|---|---|---|
| 1,043,241 | 11/1912 | Louden, Sr. . | |
| 1,395,967 | 11/1921 | Merli et al. . | |
| 1,602,331 | 10/1926 | Britton . | |
| 3,264,679 | 8/1966 | Moekle | 17/33 |
| 3,290,841 | 12/1966 | Sartore | 53/258 |
| 4,044,425 | 8/1977 | Nausedas | 17/35 |
| 4,358,873 | 11/1982 | Kollross | 17/33 |
| 4,467,499 | 8/1984 | Beckman et al. | 17/49 |

OTHER PUBLICATIONS

U.S. Patent Application Ser. No. 481,031, filed Mar. 31, 1983, in the name of Joseph Anthony Nausedas.

Primary Examiner—Willie G. Abercrombie
Attorney, Agent, or Firm—Roger Aceto

[57] ABSTRACT

Apparatus and method for cleaning residual foodstuff from a disposable stuffing tube while the stuffing tube is in a stuffing position. Just prior to the time when the casing supply is about to run out, a pusher is activated to express residual foodstuff from the tube and into the casing remaining on the tube, thereby using the residual foodstuff to form encased product.

19 Claims, 3 Drawing Figures

STUFFING HORN CLEAN OUT

BACKGROUND OF THE INVENTION

The present invention relates to stuffing machines and more particularly to an improvement in an automatic frankfurter stuffing machine of the type utilizing removable stuffing horns.

Stuffing machines using replaceable stuffing horns are known in the art. The horns used in these machines are provided with a casing supply predisposed on the stuffing horn. After the horn is mounted to the stuffing machine and its casing supply is stuffed, the horn is removed and a new horn and casing supply is installed.

When the horn is removed from the stuffing machine, there is foodstuff remaining in the horn. The problem is the removal of this foodstuff in a rapid and efficient manner which does not otherwise interfere with the stuffing operation.

In one system, as disclosed for example in a co-pending application Ser. No. 481,031, now U.S. Pat. No. 4,489,460, the casing article, including the stuffing horn and its casing supply, are carried by a rotating turret to a stuffing position. After the casing supply is exhausted, the spent stuffing horn is indexed by the turret into a stripping position where a piston is extended through the spent stuffing horn to push the foodstuff it contains into a collection bucket. Periodically, the bucket is emptied so the collected foodstuff can be reworked. In the present invention, however, an arrangement is provided which cleans out the stuffing horn in a manner that allows the residual foodstuff in the stuffing horn to pass directly into a trailing end portion of the casing on the stuffing horn, thereby directly contributing to production of a stuffed product. Such a system eliminates the need for transporting the spent stuffing horn to a separate clean-out station, and it also eliminates the need for collection of the residual foodstuff for later rework.

In the system of the present invention, a casing article, including a stuffing tube and casing supply, is carried to and located in a stuffing position, wherein a flowable foodstuff is pumped under pressure through the stuffing tube to stuff out the casing supply. Just prior to the time that the casing supply is used up, the flow of foodstuff under pressure is stopped or bypassed and a clean-out member is pushed longitudinally through the stuffing tube. The clean-out member pushes out the residual foodstuff from the stuffing tube and into the remaining portion of casing, thereby forming part of one or more additional stuffed casing products. The clean-out member is thereafter returned rapidly in a backward direction, so that a minimal amount of time is lost before the spent stuffing tube is removed and replaced by a new stuffing tube and a new supply of casing.

In order to make the most efficient use of the casing supply, it is preferred that the clean-out member be activated while there remains on the stuffing tube, a terminal length of casing sufficient to encase the volume of foodstuff contained within the stuffing tube, and sufficient to permit the closing or tying-off of the thusly stuffed casing and sufficient to permit handling the tail end of the stuffed casing during further processing. Also, the stuffed casing product made by advancing the clean-out member through the stuffing tube, preferably, has the same diameter and configuration as the stuffed product otherwise made during the conventional stuffing cycle of the stuffing machine. For this purpose, the rate of speed at which the clean-out member is advanced through the stuffing tube must be sufficient to provide the desired fully stuffed diameter.

In stuffing machines of the type shown in U.S. Pat. No. 3,115,668, a linker is used in association with the stuffing machine to form the stuffed casing into links. The linker, as is disclosed in the aforementioned patent, engages the stuffed casing and draws it forward in order to form the links. When such a linker is used with the present invention, it is preferred that the speed of the clean-out device be synchronized to the speed of the linker so that the residual foodstuff in the stuffing tube is pushed forward by the clean-out device at the same rate as the foodstuff is moved forward during the conventional stuffing operation. When this is done, the casing receives the residual food emulsion so as to produce fully stuffed links which are of substantially the same size and shape as the links which are formed during the normal stuffing operation.

SUMMARY OF THE INVENTION

In one aspect the invention may be characterized by:

a. a conduit having an outlet through which is delivered a flowable foodstuff under a first pressure;

b. means to connect in releaseable communication with said outlet, the aft end of an elongated stuffing tube which carries a casing supply composed of a shirred and longitudinally compacted casing length, wherein the flowable foodstuff delivered under pressure through said outlet passes into and through the tube for deshirring and filling casing from the casing supply at a second pressure;

c. stuffing tube clean-out means to clear foodstuff from the stuffing tube and being operative when there remains on the stuffing tube a shirred trailing end portion of the casing supply containing a deshirred terminal casing length sufficient for encasing the volume of foodstuff contained within the stuffing tube; and d. the stuffing tube clean-out means including a pressing means which is axially movable through the outlet and into the stuffing tube aft end and thence longitudinally through the stuffing tube to the fore end thereof for expressing foodstuff from the stuffing tube and into the terminal casing length deshirred from the shirred trailing end portion of the casing supply.

In one method aspect, the invention may be characterized by:

a. passing a flowable foodstuff under pressure through an outlet and into and through a stuffing tube releaseably connected in communication with the outlet, and hence into casing deshirred from a shirred casing supply carried on the stuffing tube;

b. continuing step (a) until there remains in the casing supply on the stuffing tube a terminal casing length sufficient to accommodate and encase the volume of foodstuff contained in the stuffing tube; and c. while maintaining said stuffing tube in communication with said outlet, expressing the volume of foodstuff from the stuffing tube and into the terminal casing length while preventing flowable foodstuff from passing under pressure through said outlet and into said stuffing tube.

DESCRIPTION OF THE PREFERRED EMBODIMENT

Figure 1:
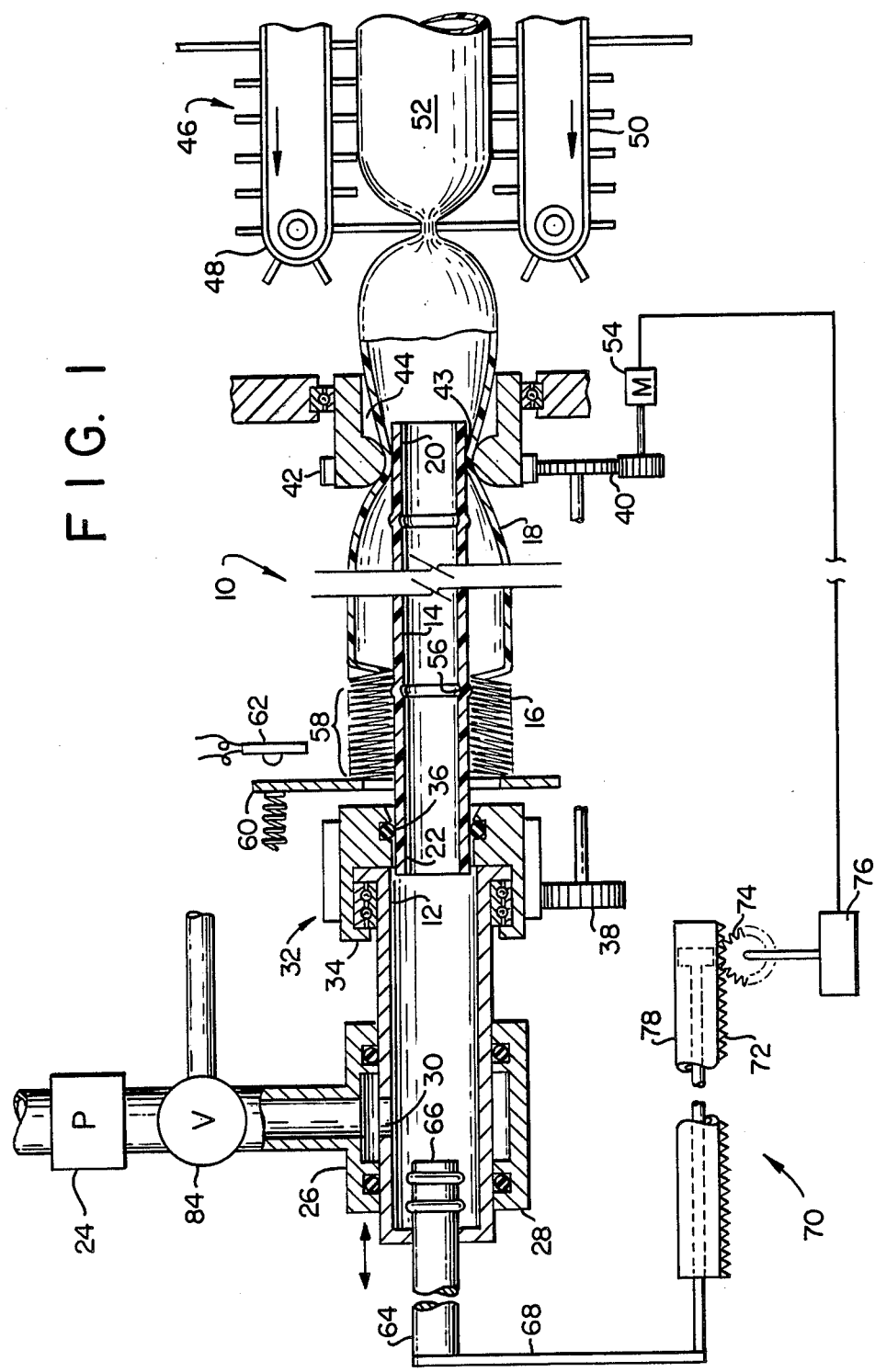
FIG. 1 is a schematic representation partly broken away in section of the clean-out mechanism of the present invention just prior to the start of the operational sequence.

Referring to the drawings, FIG. 1 shows a casing article 10 releaseably connected in communication with the outlet 12 of the stuffing machine. The casing article includes a stuffing tube 14 (preferably a disposable tube) which carries a casing supply 16 consisting of a shirred and longitudinally compacted length of casing. Preferably the pleats of the shirred casing grip about the stuffing tube so that rotation of the tube about its longitudinal axis will also rotate the casing supply. During stuffing, casing which is deshirred from this casing supply, as shown at 18, passes over the fore end 20 of the stuffing tube.

The stuffing tube has its aft end 22 releaseably communicated to outlet 12, so that a flowable foodstuff can pass under pressure directly into and through the stuffing tube to stuff the casing supply 16.

FIG. 1 also shows diagramatically components of a stuffing machine as may employ the casing article 10. The stuffing machine is preferably a type as described in U.S. Pat. No. 3,115,668, except as modified to the extent described herein. Such a machine is used in the production of frankfurters and the like, and reference is made to that patent for a more detailed description as to the function and operation of components not herein described.

The machine has a pump 24 which is connected to a source of flowable foodstuff (not shown). The discharge of the pump is in turn connected to a manifold chamber 26. Slideably extending through this manifold chamber is a conduit 28 having an inlet 30 and an outlet 12. In the position as shown in FIG. 1, the alignment of the conduit and manifold chamber is such that foodstuff can pass through the inlet 30 and into the conduit. By sliding the conduit backward, or to the left as shown in FIG. 1, inlet 30 is carried outside of the manifold chamber to prevent the flow of foodstuff under pressure into the conduit.

Rotatably carried by the conduit about inlet 12 is a rotary drive means 32. Drive means 32 is adapted to engage and rotatably drive stuffing tube 14 about the longitudinal axis of the stuffing tube. The rotary drive means itself can be any appropriate friction or positive drive which will allow rapid connect and disconnect to the aft end 22 of the stuffing tube. It should be appreciated that an appropriate rotary drive means will provide for sealing about the stuffing tube aft end 22, for rotatably driving the stuffing tube, and for holding the stuffing tube aft end within outlet 12 against the pressures exerted on the stuffing tube as foodstuff is pumped under pressure through the tube. A preferred drive is disclosed in U.S. Ser. No. 566,786. 136 which However, for purposes of illustration, and to simplify the description, a rotary drive means providing the sealing, driving and holding functions is schematically represented in FIG. 1 by a rotatable sleeve 34 having a O-ring seal 36 about its inner periphery. This O-ring seal is intended to schematically represent a means which frictionally and sealably engages about the outer circumference of the stuffing tube to provide a driving and sealing connection.

The sleeve 34 is rotated by a gear 38, which rotates the sleeve at the same speed as a gear 40 rotates a rotary drive member 42 about the fore end of the stuffing tube. Rotary member 42 receives and supports the forward end 20 of the stuffing tube. It also has an emulsion seal 43 which prevents the back flow of emulsion over the tube forward end 20 and it has inward extending vanes 44 which engage and press inward on the stuffed casing for purposes of rotating the stuffed casing. This is conventional and is shown in the aforesaid U.S. Pat. No. 3,115,668.

From the rotary member 42, the stuffed casing enters a linker mechanism 46. The linker also is conventional in the art. It consists of two chains 48 and 50 which rotate in the direction indicated. These linker chains grip the rotating stuffed casing and draw the casing forward through the linker chains. In doing so, the rotation of the stuffed casing in the grip of linker chains, as shown for example at 52, is stopped, while the rotation of the casing backward of the linker chains continues. This forms the stuffed casing into a linked product, such as frankfurters.

The linker 46, rotary member 42 and sleeve 34 can all be driven by a common motor 54.

Adjacent the aft end of stuffing tube 22 is a raised projection 56. This projection extends into the supply of shirred casing and serves to prevent the forward movement of a trailing end portion 58 of the casing supply. Projection 56 serves to hold this trailing end portion 58 of the casing supply at the position shown in FIG. 1 until all of the casing forward of the projection has been deshirred and filled. Only then will the casing begin to deshirr from the trailing end portion, thereby causing the portion to step toward projection 56 as casing is pulled forward from the projection.

The stuffing machine includes a member 60 which is biased against the trailing end of the casing supply 16. When casing begins to deshirr from the trailing end portion 58, and the trailing end portion advances towards raised portion 56, member 60 follows this movement, and it eventually contacts an end of casing sensor 62. One type of sensor which can be used is disclosed in copending application Ser. No. 481,034. In any event, the contact will initiate the termination sequence of the stuffing cycle and the position of sensor 62 can be adjusted to control the contact point and the initiation of the termination sequence depending upon the amount of casing which is required to accomodate the termination sequence.

Heretofor, when the stuffing operation was terminated, the stuffing tube 14 was removed from the stuffing position, as shown in FIG. 1, and put into a stripping position. At the stripping position, the residual foodstuff within the stuffing tube was removed and accumulated in a bucket after which the now empty tube was discarded. In the present invention, however, provision is made for expressing the residual foodstuff from the stuffing tube directly into the casing supply as the terminal part of the stuffing cycle, thereby rendering the stuffing operation more efficient.

In the present invention, the tube clean-out device is located at the stuffing position. As shown in FIG. 1, the tube clean out includes an elongated rod 64 which is slidable through conduit 28 and is axially aligned with outlet 12. This allows the rod to extend axially through the outlet and longitudinally through stuffing tube 14. The forward end of the rod carries a pusher 66 which is translatable by the rod axially through outlet 12, and into and through stuffing tube 14. The outside diameter of this pusher is such that the pusher 66 can fit into the tube 14, and when pressed forward through the tube, the pusher will express the residual foodstuff from the tube. It should be appreciated that pusher 66 can be the front face of rod 64 or it can be a separate piece attached to the rod. Also, rod 64 and/or pusher 66 preferably is rotatable or rotatably driven about its longitudinal axis so there is minimum interference with the rotation of the stuffing tube when the pusher (or rod) is within the tube.

The backward end of rod 64 is connected by a bracket 68 to a drive mechanism generally indicated as 70. In the embodiment as illustrated, this mechanism consists of two separate drives; a first drive for moving rod 64 forward, and a second drive for returning the rod to the start position as shown in FIG. 1.

It is preferred that the rate at which pusher 66 expresses the residual foodstuff from the stuffing tube simulate the rate at which the foodstuff passes through the tube under pressure during the conventional stuffing operation. It also is preferred that the speed at which the pusher moves through the stuffing tube be synchronized with the speed of the linker mechanism 46. Because the stuffing machine can be used with different stuffing tube sizes and casing sizes, and because pump efficiencies can vary, it is preferred that there be means to adjust at least the forward speed of the pusher through the stuffing tube. Meeting these conditions insures that the residual foodstuff will be formed into fully stuffed links of the appropriate length which are indistinguishable from links formed during the normal stuffing operation.

Various means can be used as a first drive for accomplishing the desired movement of pusher 66. For example, in the embodiment shown in FIG. 1 the first drive comprises a rack 72 and a drive pinion 74. The drive pinion 74 is driven by its own drive motor or by the same means which drives the linker, and it is synchronized with the speed of the linker. An adjustable drive and clutch as shown at 76 is operated in response to a signal from the end of casing sensor 62 for rotating the pinion 74 clockwise to drive the rack at a controlled rate of speed to the right, as viewed in FIG. 1. Preferably, the adjustable drive and clutch 76 is engaged so that by the time the cutoff is made, pusher 66 will be moving fast enough to continue moving foodstuff through the tube at the same controlled rate of flow as the conventional stuffing operation.

When the stuffing tube 14 has been cleaned out, pusher 66 is moved backward as fast as possible. This will allow pusher 66 to clear the stuffing tube 14 and return to its start position, as shown in FIG. 1, so that the stuffing tube can be removed and replaced by a new stuffing tube with a fresh supply of casing as quickly as possible.

This rapid return of pusher 66 can be accomplished by any suitable means. For example, as shown in FIG. 1, rack 72 carries a pneumatic cylinder 78. When the rack has reached its forward limit of travel (to the right as shown in FIG. 1) the cylinder 78 is operated to extend the piston therein to the left, as viewed in FIG. 1, thereby quickly withdrawing the pusher from the stuffing tube. Pinion 74 will then be able to take some longer time to reverse its direction of rotation and return the rack to the start position shown in FIG. 1.

It should be appreciated that the rack and pinion drive and the pneumatic cylinder are shown only to illustrate the concept of having a drive means for moving the pusher forward at a controlled rate of speed, and then rapidly returning the pusher backward. Various other drive means could be employed for the same purpose, such as a reverseable timing belt. By attaching an appropriate linkage to the timing belt, the forward and backward movement could be accomplished without reversing the direction of the belt.

Figure 2:
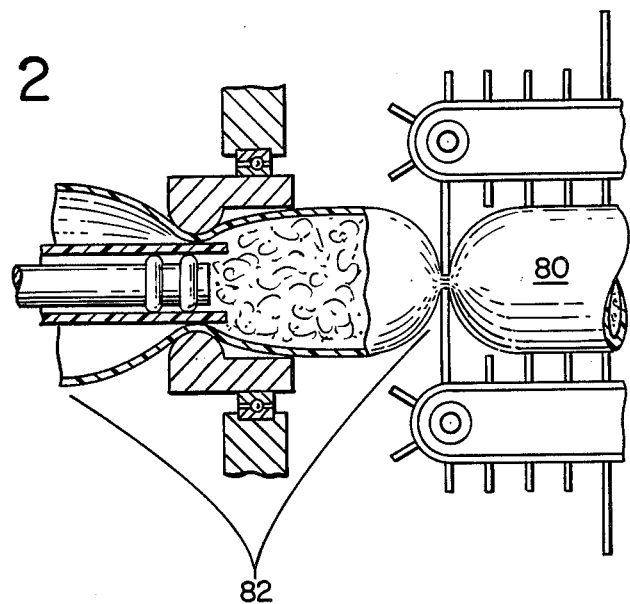
FIG. 2 is a view showing a portion of the FIG. 1 apparatus just prior to the end of the clean-out cycle.

The amount of casing remaining in the trailing end portion 58 is critical. In this respect, the terminal casing length contained in the trailing end portion 58 of the casing supply should be sufficient to accommodate and encase the volume of residual foodstuff within the stuffing tube, so that as much as practical of the residual foodstuff will form one or more links of the appropriate length and diameter. In addition, the trailing end portion should contain an amount of casing sufficient to accommodate any foodstuff remaining after the full links are formed, and sufficient to permit the subsequent handling of the linked strand of frankfurters produced by the stuffing machine. For example, it is conventional to manually tie the tail end of the casing to close it and to tie the end of one stuffed length of casing to another for processing. Accordingly, when reference is made to the terminal casing length contained in the trailing end portion 58 of the casing supply as being sufficient to accommodate and encase the volume of foodstuff in the stuffing tube to form the same into links of a given length, it should be understood that this also means that the casing length is sufficient to close the tail end of the casing to insure the integrity of the last full link and to permit subsequent handling of the length of the linked frankfurters. As shown in FIG. 2, a portion of the last full link is shown at 80 and the length of casing as may be required for subsequent handling of the linked strand is indicated at 82.

In operation, a casing article comprising the stuffing tube 14 and a casing supply 16 predisposed on the stuffing tube, is moved into axial alignment with outlet 12 and rotating member 42. Apparatus for moving the casing article into such a position forms no part of the present invention. Such a device could be a turret arrangement as disclosed in the aforementioned U.S. Ser. No. 481,031. Other locating means appropriate for the present invention is disclosed in the aforementioned U.S. Pat. No. 3,115,668.

With the casing article located in this axial alignment position, conduit 28 is moved forward, or to the right as shown in FIG. 1, by a conventional means such as a piston (not shown) attached to the conduit. As the conduit 28 moves to the right, aft end 22 of the stuffing tube 14 is received within outlet 12, and the driving elements of sleeve 34 are brought into driving engagement with the stuffing tube. Also, the forward end 20 of the stuffing tube is received within the emulsion seal 43 of rotary member 42. When inlet 30 is registered with manifold 26, foodstuff can be pumped under pressure into conduit 28 and through outlet 12 at a first pressure, and then into and through stuffing tube 14 to stuff out the casing supply contained on the stuffing tube. There is some pressure loss within the stuffing tube so the foodstuff actually enters the casing at a second pressure which is lower than the pressure of foodstuff at outlet 12. During stuffing, sleeve 34 is rotated by gear 38 to rotate the stuffing tube and its casing supply about the longitudinal axis of the stuffing tube. Rotary member 42 is also rotatably driven for rotating the stuffed casing being pressed forward from the stuffing tube and into linker mechanism 46.

Near the end of the stuffing cycle, movement of the biased member 60 will trigger the end of casing sensor 62. Sensor 62 through appropriate controls (not shown) initiates the termination sequence of the stuffing cycle, and terminates the flow of foodstuff under pressure into and through conduit 28. This can be done by either turning off pump 24 or closing valve 84, or by operation of the valve 84 to divert the flow from manifold 26.

During the termination sequence, drive means 70 is initiated to start pusher 66 moving through the conduit 28 and into stuffing tube 14. As set out hereinabove, the termination of flow of foodstuff under pressure and the initiation of the movement of pusher 66, is coordinated so there is no interruption or reduction in the rate of flow of the foodstuff through the stuffing tube. The pusher is brought up to speed and preferably enters stuffing tube 14 in a manner which maintains the stuffing pressure of foodstuff entering the casing constant with the pressure which existed when foodstuff entered the casing under pump pressure.

As pusher 66 moves axially through outlet 12 and into and through the stuffing tube, it presses forward the residual foodstuff within the tube, and it forces the foodstuff contained in the bore of the stuffing tube into the casing being deshirred from the trailing end portion 58.

At the end of its forward movement, drive means 70 is operated to reverse the direction of pusher 66 for rapidly withdrawing the pusher from the tube. Thereafter, backward movement of conduit 28 will cause the disengagement of the stuffing tube from outlet 12 and the removal of the now empty tube from the stuffing position. This immediately vacates the stuffing position to allow for the positioning means (not shown) to locate a new stuffing tube and a fresh supply of shirred casing at the stuffing position.

Figure 3:
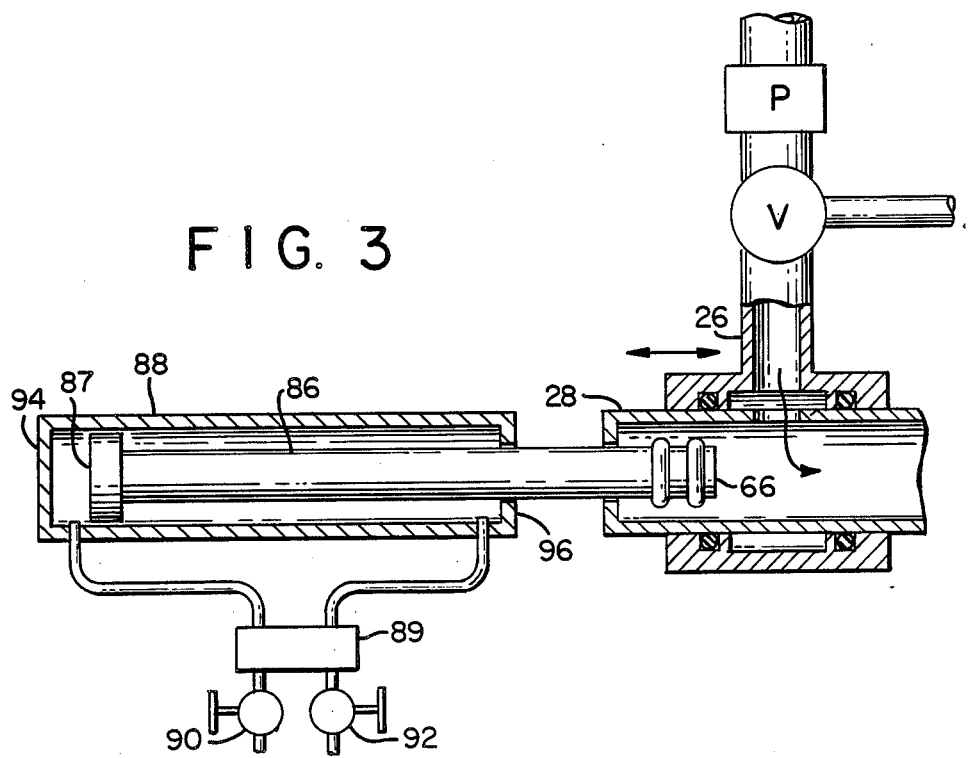
FIG. 3 is a view of a portion of the FIG. 1 apparatus showing another embodiment of the clean-out mechanism.

FIG. 3 illustrates an alternative embodiment of the clean-out mechanism wherein the forward and backward movement of the pusher are independently controllable. As shown in FIG. 3, pusher part 66 is at one end of a piston rod 86. The piston rod is part of a pneumatic system which includes an air cylinder 88, piston 87, spool valve 89 and air pressure regulators 90, 92. The air cylinder 88 is aligned with the longitudinal axis of conduit 28 so that its operation will cause the pusher 66 to translate axially and longitudinally through the stuffing tube 14 of FIG. 1.

In operation, a signal from the end of casing sensor 62 (FIG. 1) actuates the spool valve 89 so that air from the pressure regulator 90 enters air cylinder 88 at its aft end 94. This causes piston 87 to drive the rod 86 and pusher 66 to the right as viewed in the Figures. The pressure of the air entering the cylinder is sufficient to accelerate the pusher and advance it at a rate that will maintain adequate pressure in the casing being stuffed.

When the stuffing tube has been cleaned out, any suitable means such as a limit switch (not shown) actuates the spool valve 89 so it directs air from air pressure regulator 92 to the fore end 96 of the air cylinder to move the rod 86 and pusher 66 backward as fast as possible to its start position.

With this arrangement, the advance and return of the pusher 66 may be separately controlled by appropriate settings of the air pressure regulators 90, 92. This allows a range of adjustment so that the speed of the pusher part can be set to accommodate stuffing machines that have foodstuff pumps of different efficiencies. Similarly, this provision for range adjustment enables the stuffing machine to accommodate casing articles having stuffing tubes of different inside diameters and casings of different sizes, in conjunction with the provision that the pusher part 66 is replaced with equivalent pusher parts having sizes appropriate to the different inside diameters of the different stuffing tubes.

Thus it should be appreciated that the present invention provides an apparatus and method for expressing residual foodstuff from a stuffing tube directly into casing as part of the stuffing operation. This eliminates the need to move the stuffing tube to a separate position for removing this residual foodstuff and also eliminates the need to collect and rework the residual foodstuff. Furthermore, it permits simplification of the tube handling apparatus.

Having described the invention in detail, what is claimed as new is:

1. Stuffing apparatus comprising:
   a. a conduit having an outlet through which is delivered a flowable foodstuff under a first pressure;
   b. means to connect in releaseable communication with said outlet, the aft end of an elongated stuffing tube which carries a casing supply composed of a shirred and longitudinally compacted casing length, wherein the flowable foodstuff delivered under pressure through said outlet passes into and through the tube for deshirring and filling casing from the casing supply under a second pressure;
   c. stuffing tube clean-out means to clear foodstuff from the stuffing tube and being operative when there remains on the stuffing tube a shirred trailing end portion of the casing supply containing a deshirred terminal casing length sufficient for encasing the volume of foodstuff contained within the stuffing tube; and
   d. said stuffing tube clean-out means including a pressing means which is axially movable through said outlet and into the stuffing tube aft end and thence longitudinally through the stuffing tube to the fore end thereof for expressing foodstuff from the stuffing tube and into the terminal casing length deshirred from the shirred trailing end portion of the casing supply.

2. Stuffing apparatus as in claim 1 including means for moving said pressing means through the stuffing tube at a speed which presses the foodstuff from the tube and into the casing at a pressure which is constant with said second pressure.

3. Stuffing apparatus as in claim 1 wherein said tube clean-out means comprises:
   a. pressing means slidable through said tube; and
   b. drive means connected to said pressing means capable of moving said pressing means forward through said outlet and tube at a first speed and thereafter moving said pressing means backward.

4. Stuffing apparatus as in claim 3 wherein said drive means is capable of moving said pressing means backwards at a speed greater than said first speed.

5. Stuffing apparatus as in claim 3 wherein said drive means includes:
   a. an air cylinder having said pressing means connected to a piston disposed within said air cylinder;

b. valve means operating to direct air into one end of said air cylinder for moving said pressing means axially forward through said outlet and longitudinally through said tube; and c. an air pressure regulator for controlling the pressure of air entering said one end.

6. Stuffing apparatus as in claim 5 wherein said valve means is operable when said pressing means is at the fore end of said tube to direct air to a second end of said air cylinder to return said pressing means backward through said tube and outlet to its initial position.

7. Stuffing apparatus as in claim 6 including a second air regulator to control the pressure of air entering said air cylinder second end.

8. Stuffing apparatus as in claim 1 wherein said tube clean-out means includes:

a. first and second drive means operatively connected to said pressing means for translating said pressing means respectively forward through said outlet and tube, and backward to withdraw said pressing means from said tube and through said outlet; and b. said second drive means includes a member which is movable with respect to said first drive means.

9. Stuffing apparatus as in any one of claims 1–8 wherein said shirred and longitudinally compacted casing length has the pleats thereof gripping about said tube.

10. Stuffing apparatus according to claim 9 including rotary driving means engagable against an aft end portion of said tube to rotate said tube and the casing supply thereon about the longitudinal axis of said tube while foodstuff is being expressed from the tube by said pressing means.

11. Stuffing apparatus as in claim 10, including linker means operable to grip and draw filled casing forward from the tube fore end as the casing is deshirred and filled by foodstuff, and further including means to synchronize the forward movement of said pressing means with the drawing forward of filled casing.

12. Stuffing apparatus as in claim 1 including means for adjusting the speed at which said pressing means is moved through said tube to the fore end thereof.

13. Stuffing apparatus as in claim 1 including means preventing flow of foodstuff under pressure through said outlet and into said stuffing tube while said pressing means is within said stuffing tube.

14. Stuffing apparatus comprising:

a. an outlet through which a flowable foodstuff is delivered under pressure;

b. means to releaseably communicate the aft end of a stuffing tube in axial longitudinal alignment with said outlet, said stuffing tube having disposed thereon a casing supply composed of a shirred and longitudinally compacted casing length including a deshirred portion passed over the fore end of the tube, whereby foodstuff delivered from the outlet and into and through the tube stuffs and moves forward deshirred casing from the casing supply;

c. linker means engaging and drawing forward stuffed casing from the tube fore end in such a manner as to form the stuffed casing into links of a given length;

d. a part operable to press forward through said outlet and longitudinally into and through the stuffing tube communicated to said outlet for expressing the foodstuff from said stuffing tube and into the deshirred casing;

e. means initiating the operation of said part to press said part forward when there remains in the casing supply a terminal casing length corresponding substantially to that length of casing which is required to encase the volume of foodstuff in said stuffing tube and form the same into links of said given length;

f. means for pressing said part forward to said tube fore end at a first speed synchronized to the speed at which said linker means draws stuffed casing forward from the tube fore end, and for thereafter moving said part backward from the tube fore end; and g. means preventing the flow of foodstuff under pressure from passing through said outlet and entering said stuffing tube when said part is within said stuffing tube.

15. A stuffing method comprising:

a. passing a flowable foodstuff under pressure through an outlet and into and through a stuffing tube releaseably connected in communication with the outlet and hence into casing deshirred from a shirred casing supply carried on the stuffing tube;

b. continuing step (a) until there remains in the casing supply on the stuffing tube a terminal casing length sufficient to encase the volume of foodstuff contained in the stuffing tube; and c. while maintaining said stuffing tube in communication with said outlet, expressing the volume of foodstuff from the stuffing tube and into the terminal casing length while preventing flowable foodstuff from passing under pressure through said outlet and into said stuffing tube.

16. A method as set forth in claim 15 wherein said expressing step is accomplished by passing a part through said outlet and longitudinally through the stuffing tube to the fore end thereof to press the foodstuff contents of said stuffing tube forward and into the terminal casing length.

17. A method as in claim 16 including pressing said part forward at a controlled speed which forces foodstuff into the terminal casing length at a pressure substantially equal to the pressure at which foodstuff enters into said casing during step (a).

18. A method as in claim 17 including moving said part backward from said fore end at a speed greater than said controlled speed.

19. A method as in claim 16 including the step of preventing the flow of foodstuff under pressure through said outlet and into said stuffing tube while said part is passing through said tube.

* * * * *

UNITED STATES PATENT AND TRADEMARK OFFICE
CERTIFICATE OF CORRECTION

PATENT NO. : 4,570,301
DATED : February 18, 1986
INVENTOR(S) : J. H. Beckman and J. A. Nausedas It is certified that error appears in the above-identified patent and that said Letters Patent is hereby corrected as shown below:

Column 3, line 62, delete "136 which".

Signed and Sealed this

First Day of July 1986

[SEAL]

Attest:

*Attesting Officer*

DONALD J. QUIGG

*Commissioner of Patents and Trademarks*